United States Patent [19]

Indey et al.

[11] Patent Number: 5,441,072

[45] Date of Patent: Aug. 15, 1995

[54] FUEL ADDITIVE METERING SYSTEM

[75] Inventors: Sophie Indey, Lawrenceville; William Hagan, Riverton, both of N.J.

[73] Assignee: Rhone-Poulenc Inc., Princeton, N.J.

[21] Appl. No.: 203,089

[22] Filed: Feb. 28, 1994

[51] Int. Cl.$^6$ ............... F02M 43/00; G05D 11/13; F16K 15/02

[52] U.S. Cl. ............... 137/101.21; 123/1 A; 137/514.7

[58] Field of Search ............... 123/1 A; 137/98, 100, 137/101.19, 101.21, 101.31, 514.7

[56] References Cited

U.S. PATENT DOCUMENTS

| | | | |
|---|---|---|---|
| 4,161,160 | 7/1979 | Hicks et al. | 123/1 |
| 4,253,436 | 3/1981 | Dudrey | 123/198 |
| 4,329,945 | 5/1982 | Beech et al. | 123/25 B |
| 4,568,248 | 2/1986 | Hardens | 417/43 |
| 4,621,593 | 11/1986 | Rao et al. | 123/1 A |
| 4,727,827 | 3/1988 | Hoffmann et al. | 123/1 A |
| 4,955,507 | 9/1990 | Kirschner | 137/100 X |
| 5,195,466 | 3/1993 | Schultz et al. | 123/1 A |

Primary Examiner—Robert G. Nilson
Attorney, Agent, or Firm—Paul J. Juettner

[57] ABSTRACT

A fuel additive system is disclosed which comprises a sensing device for determining the flow rate of fuel into the system and for generating a signal in dependence upon the fuel flow rate, a control system for conditioning the signal to produce a proportional speed of a variable speed motor, a metering pump driven by the motor for dispensing an additive into the fuel flow at a rate proportionate to the speed of the motor, and a valving device for controlling the rate of increase in the fuel flow rate to permit the control system and the metering pump to respond to the variations within an effective response time to substantially maintain a predetermined ratio between the fuel flow rate and the additive dispensing rate.

25 Claims, 5 Drawing Sheets

FIG_1

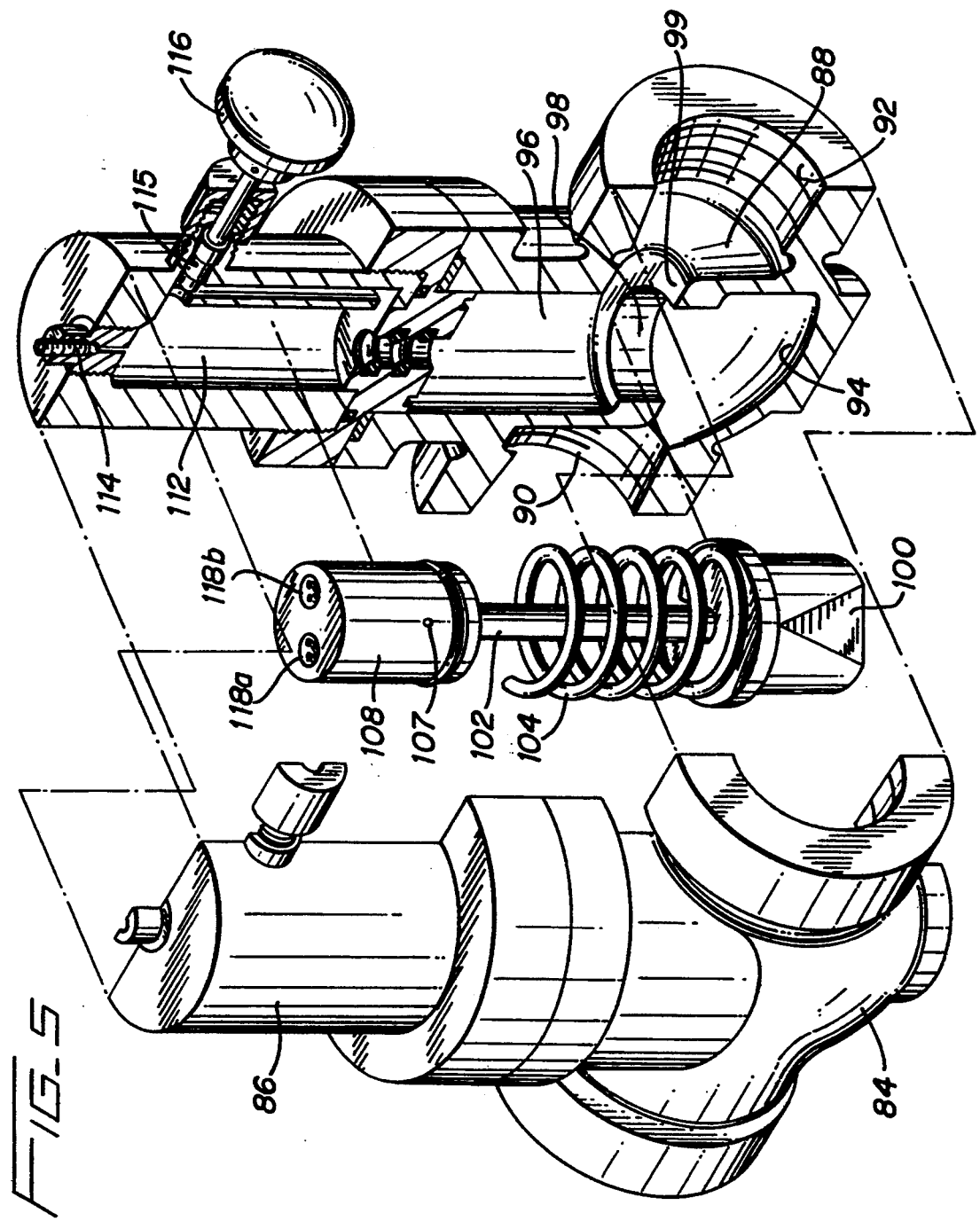
FIG_5

FUEL ADDITIVE METERING SYSTEM

BACKGROUND OF THE INVENTION

1. Field of the Invention

This invention relates to a system for dispensing an additive into a flowing stream of fluid at a rate proportionate to the rate of increase in the flow of the fluid, and more specifically, to a stationary vehicle refueling system for dispensing additive into a fuel flow at a rate proportionate to the rate of the fuel flow, particularly when the refueling cycle is brief.

2. Description of the Related Art

Fuel additives, when mixed in proper proportion, provide greater engine efficiency by improving fuel combustion, inhibit fuel from freezing in sub-zero conditions, clean fuel injectors, and reduce over-all engine wear. The additive can also serve to control the emission of unburned hydrocarbons resulting from the combustion cycle, such as in a diesel engine. In the past, fuel additives were manually dispensed into fuel tanks in measured amounts. However, this method did not always result in mixing the fuel and additive in proper proportion.

More recently, fuel additive systems have been introduced which dispense fuel additives in proportion to the amount of fuel pumped into a particular tank. One example of such a system is described in U.S. Pat. No. 4,253,436 to Dudrey. This system includes a control unit for delivering a predetermined quantity ratio of additive based on the calculated quantity of fuel loaded into the fuel tank. More particularly, the control unit functions to operate the system for a proportional time period to inject the proper quantity of additive.

Another fuel additive system is described in U.S. Pat. No. 4,621,593 to Rao et al. This system includes an apparatus for dispensing an additive into a fuel tank in dependence upon the level of fuel within the tank. U.S. Pat. No. 5,195,466 to Schulte et al. describes a method for controlling the addition of an additive into the fuel supply of a vehicle engine while the vehicle is in motion and the engine is in operation. This method involves measuring the fuel level in the vehicle fuel tank at predetermined time intervals and comparing those measurements to previously measured fuel levels. Additive is then dispensed into the fuel tank in proportion to the variations in the fuel level.

Other on-board fuel additive systems are disclosed, for example, in U.S. Pat. Nos. 4,161,160 to Hicks et al.; 4,329,945 to Beech et al.; 4,568,248 to Harders; and 4,727,827 to Hoffman et at. In general, these systems are not readily adaptable for use in conjunction with a stationary depot refueling facility, and do not include suitable structures and/or controls for ensuring that the fuel and additive will be mixed thoroughly and in proper proportion.

Accordingly, there is a need in the art for a method of and apparatus for dispensing an additive into fuel by injecting a proportioned amount of the additive into the fuel flow from a stationary storage reservoir as the fuel is loaded into a vehicle fuel tank. There is also a need in the art for novel flow rate control structure to accurately control the rate of increase in the flow rate of the liquid initially flowing through the system during the entire refueling cycle so as to accurately control the amount of additive introduced into the flowing liquid, as well as structures for efficiently mixing the fuel and additive as both pass through the system.

SUMMARY OF THE INVENTION

The subject invention provides a unique system for dispensing an additive into diesel fuel during a refueling cycle. In particular, the system includes means for maintaining the additive-fuel ratio over the entire refueling cycle.

In order to achieve a constant ratio of additive flow to fuel flow regardless of the instantaneous flow rate of the fuel, all components of the system must be linear in their response characteristics. In other words, each component must have an output that is directly proportional to the input. This linearity will guarantee that a signal transmitted through the system in response to a change in the fuel flow rate will be of the same order of magnitude between all system components. Since all system components are linear, a percentage change in the fuel flow will result in an equal percentage change in the additive flow. Accordingly, the selected additive-fuel ratio will be maintained over the entire range of the fuel loading cycle.

In addition to the linearity of all system components, the ability to manually or automatically maintain the additive-fuel ratio must be present, and the response speed of each of the system components must match the dynamics of the fuel flow rate changes.

The fuel additive system of the subject invention comprises means for controlling, in a gradual manner, any increases in the initial rate of fuel flow to permit the additive system components, including the metering pump, to respond to the flow rate variations within an effective response time thereby matching the dynamics of the fuel flow increasing rate of change. As a result, a predetermined ratio between the flow rate of the fuel and the rate at which the additive is dispensed into the fuel flow will be substantially maintained at all times during the refueling cycle.

Preferably, the flow rate control means comprises a valve device for selectively controlling the rate of increase in fuel flow rate. This device comprises a valve body defining a fuel flow path, a flow restricting member operatively associated with the flow path and moveable relative thereto in response to changes in the pressure differential of the fuel flowing through the fueling line. The flow restricting member is operated by response to increases in the pressure differential of the fuel across the valve body. The valve device can normally be closed such as by the use of a spring when the pressure of the fuel is equivalent on both sides of the valve. When the downstream pressure is reduced such as when the system is opened during refueling, the pressure of the fuel in the line will cause the valve to open against the spring. The valve device further comprises a selectively adjustable assembly for controlling the relative movement or opening of the flow restricting member. While numerous means are available for performing that function, it has been found that a selectively adjustable hydraulic dashpot assembly operatively associated with the spring biased flow restricting member, for controlling the relative movement of the flow restricting member, is an effective, economical and mechanically simplistic device for accomplishing the control of the rate of increase in the fuel flow rate.

The fuel additive system of the subject invention preferably comprises a flow meter transducer for measuring the rate at which fuel flows into the system and for transmitting a digital pulse signal proportional to the flow rate to the system components. A digital to analog transmitter converts the digital signal from the flow meter transducer into a standard control signal. The control signal is then converted to an analog signal compatible to the requirements of a rectifier for controlling the motor speed of a DC motor. Alternatively, the control signal may drive on AC invertor motor speed controller. In the preferred case of a motor speed controlling rectifier, the analog signal is converted to a proportional voltage change to produce a proportional variable speed from a DC motor. The motor is connected to a metering pump which operates at a capacity that is proportional to the input speed of the motor.

The fuel additive system of the subject invention further comprises an in-line static mixing device located downstream from the point at which additive is injected into the fuel flow. The static mixing device serves to efficiently and continuously blend the fuel and additive as both pass through the system.

These and other features of the subject invention will be made more readily apparent to those having ordinary skill in the art from the following detailed description of the invention taken in conjunction with the accompanying drawings.

BRIEF DESCRIPTION OF THE DRAWINGS

So that those having ordinary skill in the art to which the subject invention appertains will more readily understand how to make and use the fuel additive system described herein, preferred embodiments of the system of the subject invention will be described in detail hereinbelow with reference to the drawings wherein:

FIG. 2A is a schematic representation of the calibration column of the diesel fuel additive system depicted in FIG. 2 with a three-way diverting valve disposed in a drainage position;

FIG. 2B is a schematic representation of the calibration column of the fuel additive system depicted in FIG. 2 with the three-way diverting valve disposed in a calibration position;

FIG. 5 is an exploded perspective view of the ratio rate control device illustrated in FIG. 3.

DETAILED DESCRIPTION OF THE PREFERRED EMBODIMENTS

Figure 1:
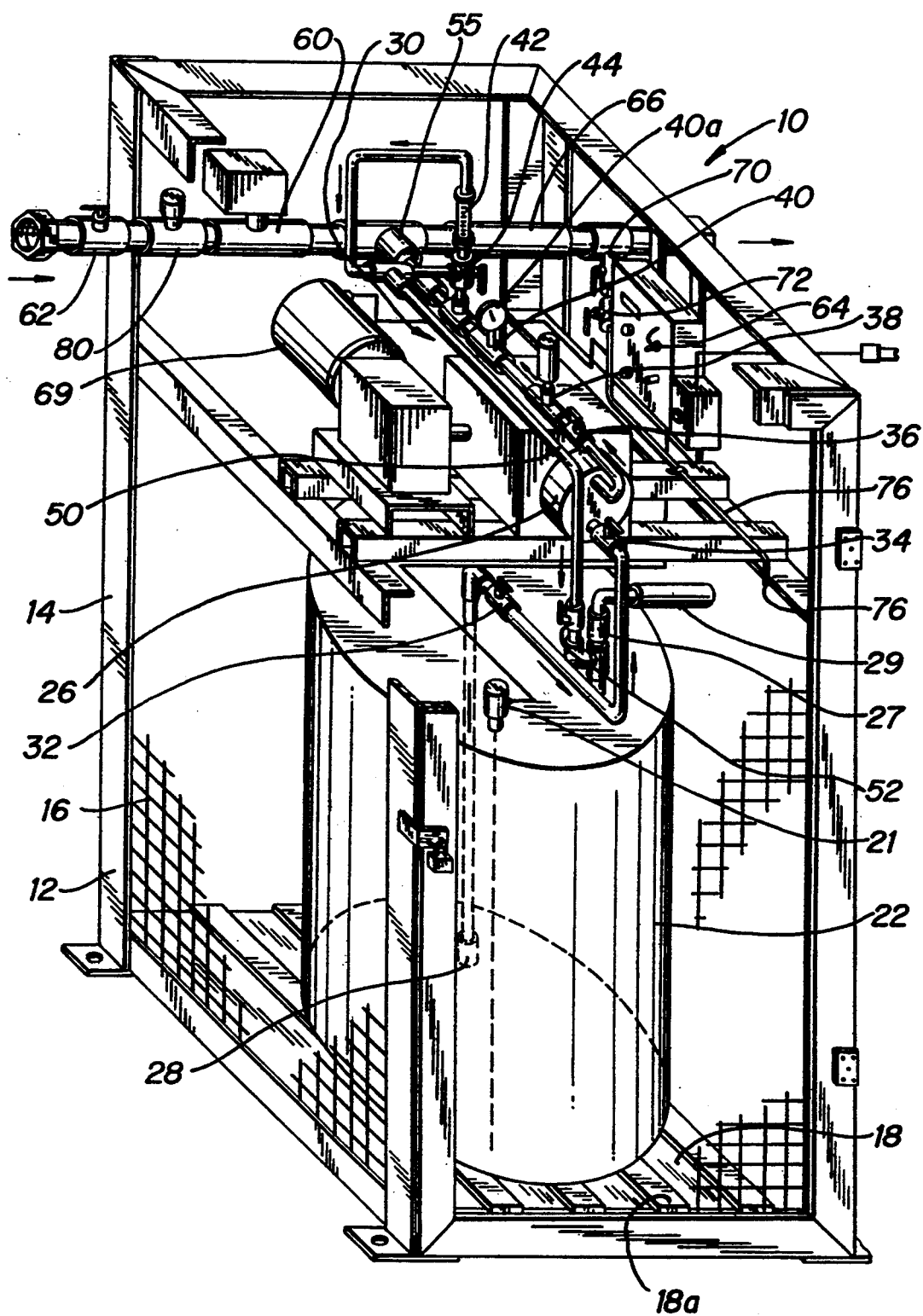
FIG. 1 is a perspective view of a diesel fuel additive system constructed in accordance with a preferred embodiment of the subject invention.

Throughout the description which follows, the term "downstream" will refer to the end of the flow path which is closer to the outlet of the system, while the term "upstream" will refer to the end of the flow path that is closer to the inlet of the system. Furthermore, the direction of fluid flow within the system will be indicated in the drawings by directional arrows.

Referring now to the drawings wherein like reference numerals indicate similar elements of the subject invention, there is illustrated in FIG. 1 a fuel additive system, such as to add a particulate control additive to diesel fuel, constructed in accordance with a preferred embodiment of the subject invention and designated generally by reference numeral 10. The fuel additive system 10 of the subject invention is configured as a self-contained stationary depot refueling system for blending a solution of fuel additive with fuel, such as diesel fuel, during a refueling operation.

Referring to FIG. 1, fuel additive system 10 is housed within an enclosure 12 having a frame 14 fabricated from welded angle steel. Wire mesh walls 16 are welded to frame 14 on five sides, and a solid bottom panel 18 forms a drip pan for enclosure 12. The front wall of enclosure 12 defines an access panel 20 which is hinged to frame 14 and configured to be locked to prevent unauthorized access to the fuel additive system 10.

Fuel additive system 10 includes an additive supply drum 22 containing a quantity of additive sufficient to treat a significantly greater quantity of fuel. The additive drum 22 is supported on rails 18a which serve to ease installation and removal of the drum.

The additive drum 22 can also be equipped with a high-low level transmitter 21. Level transmitter 21 cooperates with a signal transmitter 23 and a level relay device 24 (see FIG. 2). A high or low drum level will trigger a visual and audible alarm, and a low level will cause flow controller 25 to lock-out the system, stopping its operation until the additive drum 22 is replaced. If the additive solution utilized in this system is flammable and/or moisture sensitive, a flame arrester 27 and/or an intake air dryer 29 can be provided to protect the product contained within additive drum 22.

An additive metering pump 26 is provided for drawing the additive from storage drum 22 and dispensing the additive into the diesel fuel flow as it passes through the system. Additive metering pump 26 can be any type of metering pump effective to provide the desired flow rates, e.g., a packless diaphragm metering type pump, with a built-in ratio control knob (not shown). The ratio control knob is provided for setting the desired ratio of additive flow to fuel flow. Metering pump 26 is preferably driven by a variable speed DC motor assembly having an explosion proof enclosure. Additive drawn from supply drum 22 by metering pump 26 flows through a foot valve 28 disposed within drum 22 and having a strainer (not shown) associated therewith to prevent foreign matter from entering into the additive line.

Figure 2:
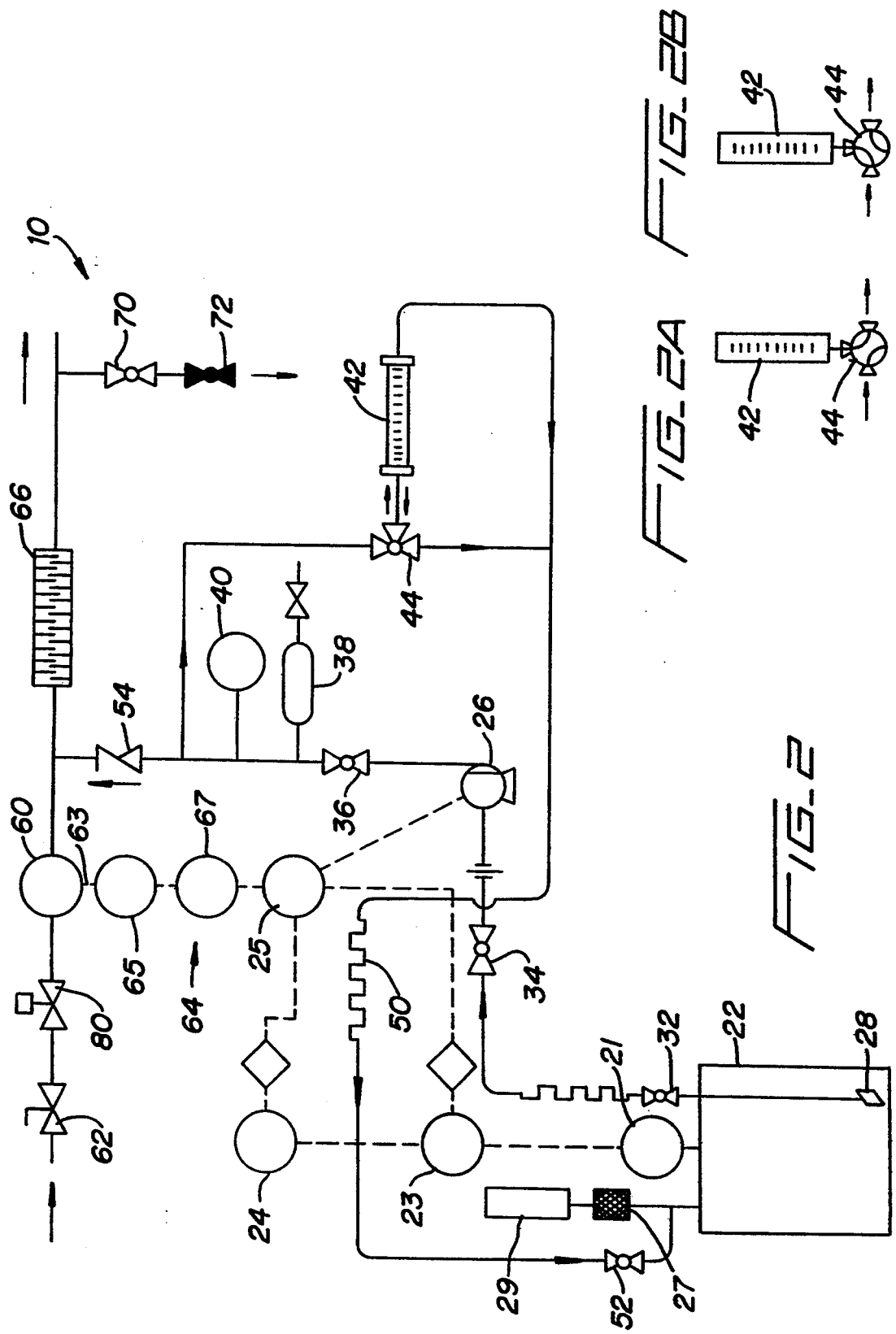
FIG. 2 is a schematic representation of the diesel fuel additive system illustrated in FIG. 1.

Referring to FIG. 1 in conjunction with FIG. 2, a quick-disconnect fitting 32 is positioned adjacent additive drum 22 to ease installation and removal of additive drum 22. Alternatively, a manually actuable block valve 32 may be positioned adjacent additive drum 22 for disconnecting the additive line from the drum. Block valves 34 and 36 are positioned adjacent the intake and outlet of metering pump 26 to ease installation, service, and removal of metering pump 26.

Additive discharged from metering pump 26 is pumped through a pulsation dampener 38. Pulsation dampener 38 is provided to smooth the normally intermittent flow delivered from the metering pump 26 into a continuous pulse free stream. Upon exiting the pulsation dampener 38, the additive flow passes through a pressure indicator 40 having an analog pressure gauge to permit visual observation of flow dynamics. Downstream from the pressure indicator 40 there is provided a graduated calibration column 42 that permits on-site verification and calibration of the additive flow rate.

Referring to FIGS. 2A and 2B, a three-way valve 44 is provided for selectively diverting the additive flow into calibration column 42. Diverting valve 44 has a plurality of operating positions. In a drainage position illustrated in FIG. 2A, additive is directed toward the supply drum 22. In a calibration position illustrated in FIG. 2B, additive is conducted through the calibration column 42 for observation.

With continued reference to FIG. 2, a return conduit 50 is provided for directing the additive drained from calibration column 42 back toward the additive storage drum 22. A quick-disconnect fitting 52 is provided at the exit end of return conduit 50 for disconnecting the additive drainage flow and to prevent leakage. Alternatively, a block valve may be utilized. Additive exiting fitting 52 or the alternative block valve is directed into additive drum 22.

Under normal operating conditions, additive exiting from pressure indicator 40 is directed through a back pressure check valve 54 which is installed at the additive injection point of system 10 (see FIG. 2). Check valve 54 functions to prevent draining (and syphoning) of the additive line when the fuel additive system 10 is not in operation.

At the additive injection point, which is indicated by reference numeral 55, fuel additive is dispensed into the fuel flow. Injection point 55 is located downstream from a flow transmitter 60 which measures the diesel fuel flow by an internal positive displacement flow meter that transmits a digital pulse frequency proportionate to the measured fuel flow entering the fuel additive system 10 through a main shut-off valve 62.

As depicted schematically in FIG. 2 and illustrated in FIG. 1, the digital pulse signal generated within flow transmitter 60 is transmitted through a carrier line 63 to an instrument receiver 64. The instrument receiver 64 includes a signal conditioner 65 and a signal isolator 67 which serve to condition the digital frequency to a proportional analog signal. The analog signal then becomes the input signal for the flow controller 25. Flow controller 25 is a SCR (silicone controlled rectifier) full wave rectified speed controller. The output signal of flow controller 25 controls the speed of the DC motor 69 which drives the additive metering pump 26.

Preferably, the flow transmitter 60, the flow controller 25, and the additive pump 26 are all linear in operation, and therefore the additive flow rate will always be in specific proportion to the diesel flow rate entering the fuel additive system 10, regardless of the diesel fuel flow rate. As noted above, the precise ratio of additive to fuel is a function of the additive pump ratio control knob setting. Mixing of the additive and fuel is intensified by an in-line static mixer 66 which is located downstream from the additive injection point 55.

Downstream from static mixer 66 and proximate the outlet point of the fuel additive system 10, there is provided a fifth block valve 70 for diverting a sample of the combined fuel-additive flow out of the main flow path. A sample diverted by valve 70 is directed through a spring return safety shut-off valve 72 and to a conduit 74 having an open outlet end 76 through which the sample is expelled. The sample may be drawn while the system is at rest or in operation and may be used for analytical purposes.

During a refueling operation, the rate at which fuel flows through the system increases from zero to full flow at the initiation of the refueling cycle. Because of lag time in the additive loop, it may become difficult to maintain the selected ratio of fuel flow to additive flow over the entire refueling cycle. In particular, the initial response speed of the system components may not match the dynamics of the initial fuel flow rate increase which can vary from slow gradual changes to erratic and instantaneous changes of high magnitude that can put a great strain on the response speed of the additional system components.

In order to meet the requirements of instantaneous response to the initial rate of increase in the fuel flow rates, the fuel additive system 10 of the subject invention is provided with a ratio rate control valve 80, positioned upstream from flow transmitter 60, that permits exact tuning of the additive metering system response time to the instantaneous fuel flow rate. Moreover, the control valve provides a mechanism for controlling the initial increase in flow rate of fuel to acquire additional time to allow the control system to respond. Accordingly, the precise additive to fuel ratio can be maintained at all times during the refueling cycle.

Figure 3:
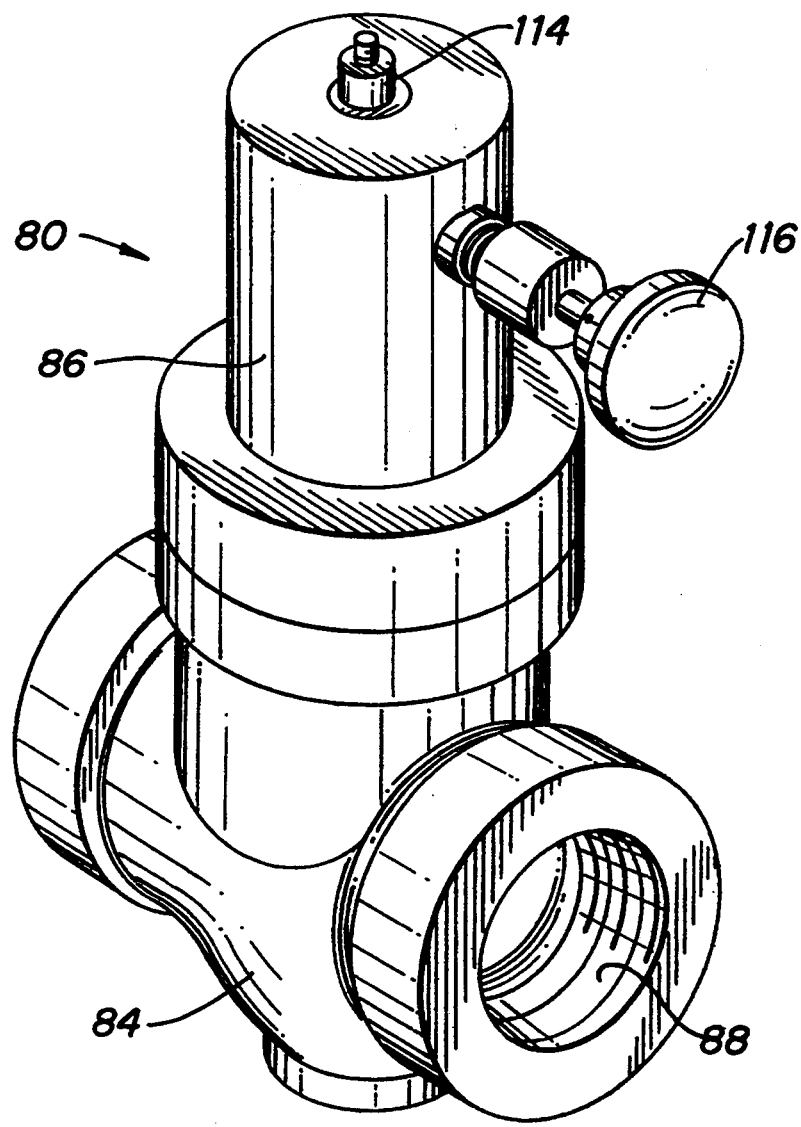
FIG. 3 is a perspective view of a ratio rate control device constructed in accordance with a preferred embodiment of the subject invention and configured for utilization in conjunction with the diesel fuel additive system of FIG. 1.
Figure 4:
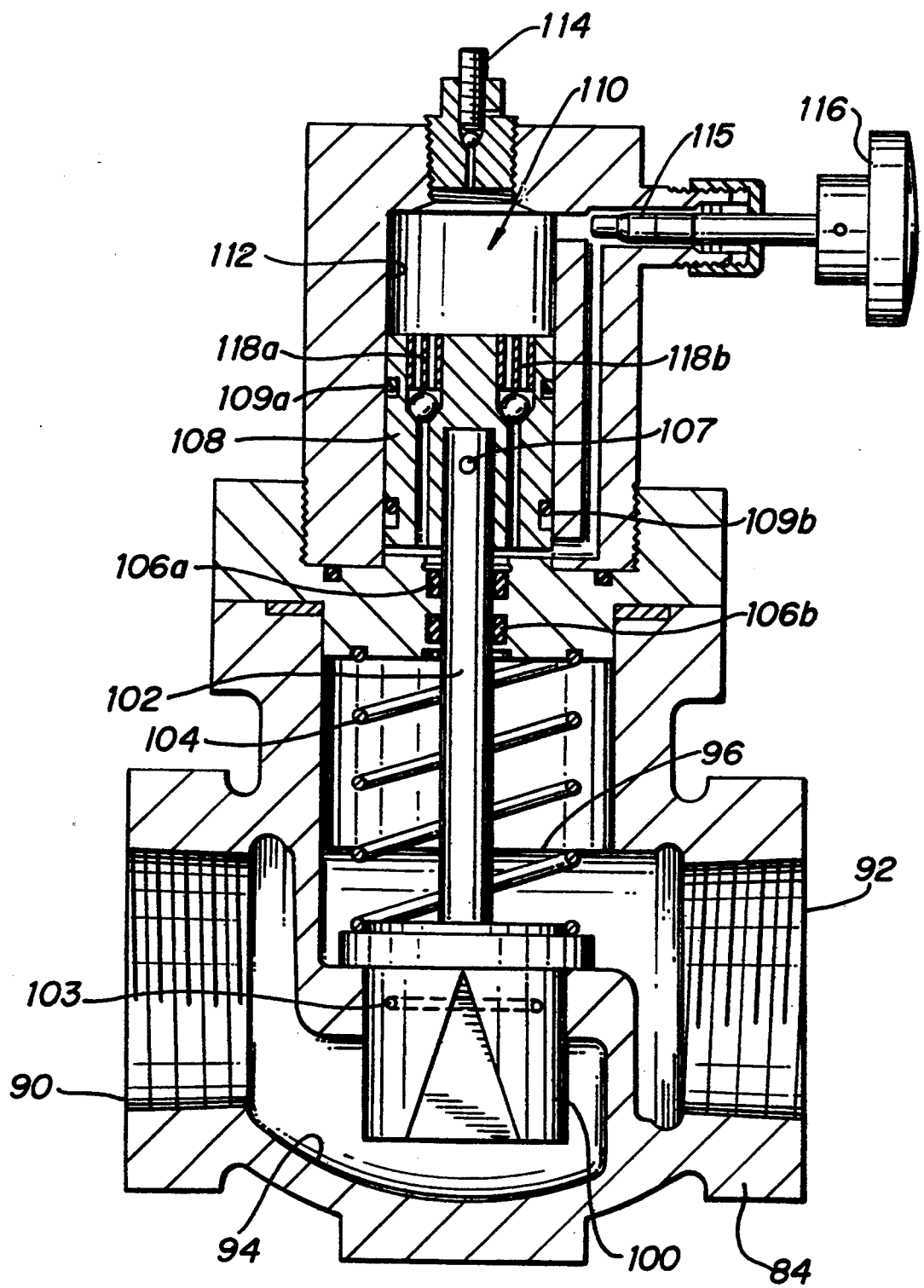
FIG. 4 is a side elevational view in cross-section of the ratio rate control device illustrated in FIG. 3.

Referring to FIGS. 3-5, ratio rate control valve 80 comprises an elongated valve body 84 and a transverse valve housing 86 enclosing a flow dampening mechanism in the form of a dashpot. A circuitous flow path 88 extends through valve body 84 from an inlet port 90 to an outlet port 92. Flow path 88 defines an influx chamber 94 which extends from inlet port 90 and an efflux chamber 96 which extends to outlet port 92. A transfer orifice 98 is defined in a barrier wall 99 which separates the influx chamber 94 and the efflux chamber 96.

A high-lift variable area flow restricter 100 is configured to translate relative to transfer orifice 98, in a vertical direction, to control the flow of fuel passing through the ratio rate control valve 80. An elongated valve stem 102 is mounted to flow restricter 100 by a transverse roll pin 103. Valve stem 102 extends through valve body 84 and into the valve housing 86. A coiled compression spring 104 is disposed about valve stem 102 and serves to bias the flow restricter 100 into a blocking position wherein fuel flow through transfer orifice 98 is substantially obstructed. Elastomeric annular seals 106a and 106b are also provided within valve body 84 and are positioned about valve stem 102 to inhibit fuel leakage.

The upper portion of valve stem 102 is mounted to a cylindrical piston head 108 by a transverse roll pin 107. Piston head 108 forms part of a double acting hydraulic dashpot assembly 110 enclosed within valve housing 86. Dashpot assembly 110 includes a compression chamber 112 housing piston head 108 and containing hydraulic fluid. Piston head 108 is circumscribed by upper and lower piston rings 109a and 109b which serve to maintain a fluid seal about the piston head.

A bleed valve 114 is provided at the top of compression chamber 110 for relieving air and any excess hydraulic fluid therefrom. A throttle valve 115 is also associated with compression chamber 112 and includes a control knob 116 for selectively adjusting the hydraulic fluid by-pass rate within chamber 112. Controlling the fluid by-pass rate effectively controls the rate of change in the vertical movement of the variable area flow restricter 100, resulting in control of the increase in fuel flow rate of change. Preferably, one-way check valves 118a and 118b are provided within piston head 108 which remain in a closed position when piston head 108 rises to force hydraulic fluid through throttle valve 115. In an open position, check valves 118a and 118b advantageously facilitate an instantaneous drop of piston head 108 at the end of a fuel filling cycle by allowing hydraulic fluid to escape without passing through throttle valve 115.

Under steady state conditions, when the additive system of the subject invention is not in use, the facility fuel supply is constantly under circulation within a recirculating loop to assure the availability of pressurized fuel to the additive system at all times. At the same time however, fuel within the additive line is static and pressure is equalized throughout the system.

In use, when the system is activated at the beginning of a refueling cycle, flow will immediately exit from the system outlet. This action will instantaneously activate the fuel flow transmitter 60 which, in turn, will activate other control components and subsequently increase the speed of additive pump 26. As a result, the additive line will be pressured to a sufficient degree to overcome the back pressure at the additive injection point 55. At such a time, flow restricter 100 will gradually open in response to the pressure differential across ratio rate control valve 80. The rate at which the flow restricter 100 opens the transfer orifice 98 is a function of the setting of the throttle valve 115. At the end of a refueling cycle, fuel flow from the system will be terminated and pressure within the system will become equalized, closing flow restricter 100.

Although the subject invention has been described with respect to a preferred embodiment, it will be readily apparent to those having ordinary skill in the art to which it appertains that changes and modifications may be made thereto without departing from the spirit or scope of the subject invention as defined by the appended claims.

What is claimed is:

1. A system for dispensing an additive into a flowing fluid comprising:
   a) a sensing device for determining the flow rate of fluid entering the system and for generating a signal in dependence upon said fluid flow rate;
   b) means for conditioning said signal to produce a proportional speed of a variable speed motor assembly;
   c) a metering pump driven by said motor assembly for dispensing an additive into the fluid flow at a rate proportionate to the speed of said motor assembly; and
   d) means for controlling the rate of increase in said fluid flow rate to permit said signal conditioning means and said metering pump to respond to said variations within an effective response time.

2. A system as recited in claim 1, wherein said sensing device is configured to generate a digital signal proportional to said fluid flow rate.

3. A system as recited in claim 2, wherein said signal conditioning means includes means for converting said digital signal to an analog signal, and means for converting said analog signal to a proportional voltage change to drive said motor assembly.

4. A system as recited in claim 1, wherein said means for controlling the rate of increase in said fluid flow rate comprises a valving device including means for varying the orifice opening in said valving device to effect such control.

5. A system as recited in claim 1, wherein said means for controlling the rate of increase in said fluid flow rate comprises a valving device including a spring biased valving member operatively associated with a hydraulic dashpot assembly.

6. A system as recited in claim 5, further comprising means for selectively adjusting said dashpot assembly to control the movement of said valving member.

7. A system as recited in claim 1, further comprising means for storing said additive for dispensation into the fluid flow.

8. A system as recited in claim 7, further comprising means for sensing the level of additive within said additive storing means.

9. A system as recited in claim 1, wherein said additive system is configured as a self-contained unit.

10. A system as recited in claim 9, wherein said self-contained unit is adapted for utilization in a depot refueling facility.

11. A system as recited in claim 1, further comprising means for continuously blending said fluid and said additive prior to directing said fluid and said additive toward a final destination.

12. A system as recited in claim 11, wherein said blending means comprises an in-line static mixing device.

13. A system for blending an additive into a fuel comprising:
   a) a sensing device for determining the flow rate of fuel entering the system and for generating a signal in dependence upon said fuel flow rate;
   b) means for conditioning said signal to produce a proportional speed of a variable speed motor assembly;
   c) a metering pump driven by said motor assembly for dispensing an additive into the fuel flow at an additive dispensing rate proportionate to the speed of said motor assembly; and
   d) means for controlling the rate of increase in said fuel flow rate to permit said signal conditioning means and said metering pump to respond to said variations within an effective response time to substantially maintain a predetermined ratio between the fuel flow rate and the additive dispensing rate.

14. A fuel additive system as recited in claim 13, wherein said sensing device is configured to generate a digital signal proportional to said fuel flow rate.

15. A fuel additive system as recited in claim 14, wherein said signal conditioning means includes means for converting said digital signal to an analog signal, and means for converting said analog signal to a proportional voltage change to drive said motor assembly.

16. A fuel additive system as recited in claim 13, wherein said means for controlling the rate of increase in said fluid flow rate comprises a valving device including means for gradually dampening variations in said fuel flow rate.

17. A fuel additive system as recited in claim 13, wherein said means for controlling the rate of increase in said fluid flow rate comprises a valving device including a spring biased valving member operatively associated with a hydraulic dashpot assembly.

18. A fuel additive system as recited in claim 17, further comprising means for selectively adjusting said dashpot assembly to control the movement of said valving member.

19. A fuel additive system as recited in claim 13, further comprising means for continuously blending said fuel and said additive prior to directing said fuel and said additive toward a fuel tank.

20. A fuel additive system as recited in claim 13, wherein said additive system is configured as a self-contained unit for utilization in a depot refueling facility.

21. A fuel additive system as recited in claim 19, wherein said blending means comprises an in-line static mixing device.

22. A self-contained fuel additive system for a depot refueling station comprising:
   a) outlet means from the refueling station;
   b) a flow meter for determining the flow rate of fuel exiting the outlet means;
   c) a transmitter operatively associated with said flow meter for generating a signal in dependence upon said fuel flow rate;
   d) a signal conditioner for converting said signal generated by said transmitter to produce a proportional speed of a variable speed motor assembly;
   e) a metering pump driven by said motor assembly for dispensing an additive into the fuel flow at a rate proportionate to the speed of said motor assembly; and
   f) a control valve disposed adjacent said flow meter for controlling the rate of increase in said fuel flow rate as fuel exits the outlet means.

23. A self-contained fuel additive system as recited in claim 22, wherein said transmitter is configured to generate a digital signal proportional to said fuel flow rate.

24. A self-contained fuel additive system as recited in claim 23, wherein said signal conditioner is configured to convert said digital signal to an analog signal, and convert said analog signal to a proportional voltage change to drive said motor assembly.

25. A self-contained fuel additive system as recited in claim 22, wherein said control valve includes a spring biased valving member operatively associated with a hydraulic dashpot assembly.

* * * * *